(12) United States Patent
Safai

(10) Patent No.: US 11,169,098 B2
(45) Date of Patent: Nov. 9, 2021

(54) SYSTEM, METHOD, AND APPARATUS FOR X-RAY BACKSCATTER INSPECTION OF PARTS

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/838,329

(22) Filed: Apr. 2, 2020

(65) Prior Publication Data

US 2021/0310967 A1   Oct. 7, 2021

(51) Int. Cl.
| | |
|---|---|
| *G01N 23/20008* | (2018.01) |
| *G01N 23/203* | (2006.01) |
| *G21K 1/04* | (2006.01) |
| *H01J 35/14* | (2006.01) |
| *H01J 35/12* | (2006.01) |

(52) U.S. Cl.
CPC ..... *G01N 23/20008* (2013.01); *G01N 23/203* (2013.01); *G21K 1/043* (2013.01); *H01J 35/147* (2019.05); *H01J 35/153* (2019.05); *G01N 2223/053* (2013.01); *G01N 2223/055* (2013.01); *G01N 2223/31* (2013.01); *G01N 2223/313* (2013.01); *G01N 2223/316* (2013.01); *H01J 35/12* (2013.01); *H01J 2235/1204* (2013.01)

(58) Field of Classification Search
None
See application file for complete search history.

(56) References Cited

U.S. PATENT DOCUMENTS

| 4,277,684 A | * | 7/1981 | Carson | A61B 6/032 378/7 |
|---|---|---|---|---|
| 4,698,835 A | * | 10/1987 | Ono | H01J 35/147 378/136 |
| 4,730,353 A | * | 3/1988 | Ono | H01J 35/14 378/138 |

(Continued)

FOREIGN PATENT DOCUMENTS

WO   2019214671   11/2019

OTHER PUBLICATIONS

Safai, M., U.S. Appl. No. 16/833,297, filed Mar. 27, 2020.

*Primary Examiner* — Thomas R Artman
(74) *Attorney, Agent, or Firm* — Kunzler Bean & Adamson

(57) ABSTRACT

Disclosed herein is an x-ray backscatter apparatus for non-destructive inspection of a part. The apparatus comprises an emission shaping mechanism that is configured to receive an electron emission from a cathode and to adjust a shape of the electron emission from a circular cross-sectional shape into a first elliptical cross-sectional shape. The x-ray source further comprises an anode that is configured to convert the electron emission into an unfiltered x-ray emission having a second elliptical cross-sectional shape. The apparatus also comprises an x-ray filter that comprises an emission aperture having a cross-sectional area smaller than an area of the second elliptical cross-sectional shape of the unfiltered x-ray emission. The x-ray filter is located relative to the unfiltered x-ray emission to allow only a portion of the unfiltered x-ray emission to pass through the emission aperture and form a filtered x-ray emission.

20 Claims, 9 Drawing Sheets

(56) References Cited

U.S. PATENT DOCUMENTS

| | | | |
|---|---|---|---|
| 4,870,671 A | 9/1989 | Hershyn | |
| 5,625,661 A * | 4/1997 | Oikawa | A61B 6/022 378/15 |
| 8,761,338 B2 | 6/2014 | Safai | |
| 8,855,268 B1 * | 10/2014 | Safai | G01N 23/203 378/87 |
| 9,014,339 B2 * | 4/2015 | Grodzins | G21K 1/043 378/146 |
| 9,020,103 B2 * | 4/2015 | Grodzins | G21K 1/046 378/146 |
| 9,052,271 B2 * | 6/2015 | Grodzins | A61B 6/06 |
| 9,151,721 B2 | 10/2015 | Safai | |
| 9,291,582 B2 * | 3/2016 | Grodzins | G02B 27/30 |
| 9,355,810 B2 * | 5/2016 | Chen | H01J 35/153 |
| 9,779,908 B2 * | 10/2017 | Ding | H05G 1/12 |
| 10,535,491 B2 * | 1/2020 | Rommel | H01J 35/153 |
| 10,541,061 B2 * | 1/2020 | Wang | A61B 6/42 |
| 10,762,998 B2 * | 9/2020 | Rothschild | G01V 5/0041 |
| 2002/0085675 A1 | 7/2002 | Snyder et al. | |
| 2005/0180542 A1 | 8/2005 | Leue et al. | |
| 2007/0172031 A1 * | 7/2007 | Cason | G21K 1/043 378/146 |
| 2007/0195938 A1 | 8/2007 | Bailey et al. | |
| 2007/0269014 A1 | 11/2007 | Safai et al. | |
| 2012/0106714 A1 * | 5/2012 | Grodzins | G01N 23/046 378/146 |
| 2012/0269319 A1 * | 10/2012 | Grodzins | G01N 23/203 378/51 |
| 2012/0321046 A1 * | 12/2012 | Safai | G01N 23/203 378/86 |
| 2013/0195248 A1 | 8/2013 | Rothschild et al. | |
| 2014/0056412 A1 * | 2/2014 | Chen | H05G 1/025 378/137 |
| 2014/0064453 A1 * | 3/2014 | Safai | H01J 35/04 378/87 |
| 2015/0173692 A1 * | 6/2015 | Heuscher | A61B 6/4028 378/4 |
| 2015/0371809 A1 * | 12/2015 | Ding | G21K 1/046 378/101 |
| 2017/0358380 A1 * | 12/2017 | Rothschild | G21K 1/043 |
| 2018/0012724 A1 * | 1/2018 | Rommel | H01J 35/153 |
| 2019/0164717 A1 * | 5/2019 | Bartzsch | H01J 35/26 |
| 2020/0096457 A1 * | 3/2020 | Safai | G01N 23/203 |

* cited by examiner

SYSTEM, METHOD, AND APPARATUS FOR X-RAY BACKSCATTER INSPECTION OF PARTS

FIELD

This disclosure relates generally to the non-destructive inspection of parts, and more particularly to inspection of parts using x-ray backscatter apparatuses, systems, and methods.

BACKGROUND

Some inspection techniques, such as non-destructive testing, foreign object detection, non-line-of-site examination, etc., are employed when destruction of a part to be inspected is not desirable. Certain x-ray inspection techniques provide a penetrating scan or examination of a part. Such x-ray inspection techniques are used in a variety of applications, such as homeland security, oil and gas mining and refining, pipeline inspection, transportation, automotive, aerospace, marine, mining, shipping, and storage, among others.

Some inspection techniques utilize the detection of x-rays that pass through a part from one side of the part to the opposite side of the part. However, in other inspection techniques, such as x-ray backscattering techniques, the x-rays reflected back from the part (e.g., backscattered x-rays) are detected and then used to produce images or an analysis of the part. The pattern and intensity of the backscattered x-rays depends upon the materials and organization of the part. Accordingly, the pattern and intensity of the backscattered x-rays can be used to generate an image, which is relied upon to determine a quality, characteristic, or flaw of the part.

The configuration of conventional x-ray backscatter systems wastes up to 90% of the energy input into the systems. This is mainly due to the remoteness of the x-ray filtering device or wheel relative to the x-ray emission source and the circular shape of the x-ray emission generated by the x-ray emission source. Reducing wasted energy while still providing high quality and accurate inspection of parts is desirable.

SUMMARY

The subject matter of the present application has been developed in response to the present state of the art, and in particular, in response to the shortcomings of conventional x-ray backscatter techniques and systems, that have not yet been fully solved by currently available techniques. Accordingly, the subject matter of the present application has been developed to provide an x-ray backscatter apparatus, system, and method that overcome at least some of the above-discussed shortcomings of prior art techniques.

The following is a non-exhaustive list of examples, which may or may not be claimed, of the subject matter, disclosed herein.

Disclosed herein is an x-ray backscatter apparatus for non-destructive inspection of a part. The apparatus comprises an x-ray source that comprises a cathode. The cathode is selectively operable to generate an electron emission having a circular cross-sectional shape. The x-ray source also comprises an emission shaping mechanism that is configured to receive the electron emission from the cathode and to adjust a shape of the electron emission from the circular cross-sectional shape into a first elliptical cross-sectional shape. The x-ray source further comprises an anode that is configured to receive the electron emission having the elliptical cross-sectional shape from the emission shaping mechanism and convert the electron emission into an unfiltered x-ray emission having a second elliptical cross-sectional shape corresponding with the first elliptical cross-sectional shape. The apparatus also comprises an x-ray filter that comprises an emission aperture having a cross-sectional area smaller than an area of the second elliptical cross-sectional shape of the unfiltered x-ray emission. The x-ray filter is located relative to the unfiltered x-ray emission to allow only a portion of the unfiltered x-ray emission to pass through the emission aperture and form a filtered x-ray emission. The preceding subject matter of this paragraph characterizes example 1 of the present disclosure.

The emission shaping mechanism comprises at least one pair of deflection plates that is configured to adjust the shape of the electron emission as the electron emission passes between the deflection plates of the at least one pair of deflection plates. Each deflection plate of the at least one pair of deflection plates is configured to generate an electromagnetic field. The preceding subject matter of this paragraph characterizes example 2 of the present disclosure, wherein example 2 also includes the subject matter according to example 1, above.

The emission shaping mechanism comprises a first pair of deflection plates and a second pair of deflection plates. The first pair of deflection plates is configured to adjust the shape of the electron emission from the circular cross-sectional shape to a third elliptical cross-sectional shape. The second pair of deflection plates is configured to adjust the shape of the electron emission from the third elliptical cross-sectional shape to the first elliptical cross-sectional shape. The third elliptical cross-sectional shape is different than the first elliptical cross-sectional shape. The preceding subject matter of this paragraph characterizes example 3 of the present disclosure, wherein example 3 also includes the subject matter according to any one of examples 1-2, above.

The first pair of deflection plates increases a length of the circular cross-sectional shape. The second pair of deflection plates decreases a width of the third elliptical cross-sectional shape. The preceding subject matter of this paragraph characterizes example 4 of the present disclosure, wherein example 4 also includes the subject matter according to example 3, above.

The emission shaping mechanism comprises a first pair of deflection plates and a second pair of deflection plates. The deflection plates of the first set of deflection plates are spaced apart from each other and parallel to a first plane. The deflection plates of the second set of deflection plates are spaced apart from each other and parallel to a second plane. The first plane is perpendicular to the second plane. The preceding subject matter of this paragraph characterizes example 5 of the present disclosure, wherein example 5 also includes the subject matter according to any one of examples 1-4, above.

The x-ray source further comprises at least one alignment coil that is configured to adjust a directionality of the electron emission relative to the anode. The preceding subject matter of this paragraph characterizes example 6 of the present disclosure, wherein example 6 also includes the subject matter according to any one of examples 1-5, above.

The x-ray source further comprises a first alignment coil and a second alignment coil. The first alignment coil is interposed between the cathode and the emission shaping mechanism. The second alignment coil is interposed between the emission shaping mechanism and the anode. The preceding subject matter of this paragraph characterizes example 7 of the present disclosure, wherein example 7 also includes the subject matter according to any one of examples 1-6, above.

The x-ray filter comprises a filter ring. The emission aperture is formed in the filter ring. The filter ring is rotatable about the anode to move the emission aperture relative to the unfiltered x-ray emission. The preceding subject matter of this paragraph characterizes example 8 of the present disclosure, wherein example 8 also includes the subject matter according to any one of examples 1-7, above.

The x-ray filter comprises a filter ring. The filter ring is rotatable in a rotational direction. The second elliptical cross-sectional shape of the unfiltered x-ray emission projects onto the filter ring and is elongated in the rotational direction when projected onto the filter ring. The preceding subject matter of this paragraph characterizes example 9 of the present disclosure, wherein example 9 also includes the subject matter according to any one of examples 1-8, above.

The x-ray backscatter apparatus further comprises a vacuum tube. The x-ray filter comprises a filter ring. The emission aperture is formed in the filter ring. The x-ray source is enclosed within the vacuum tube. The x-ray filter is external to the vacuum tube. The filter ring is supported by and moves along the vacuum tube. The preceding subject matter of this paragraph characterizes example 10 of the present disclosure, wherein example 10 also includes the subject matter according to any one of examples 1-9, above.

Further disclosed herein is an x-ray backscatter apparatus for non-destructive inspection of a part. The apparatus comprises a vacuum tube. The apparatus also comprises an x-ray source, enclosed within the vacuum tube and comprising a cathode, which is selectively operable to generate an electron emission, and an anode, which is configured to receive the electron emission and convert the electron emission into an unfiltered x-ray emission. The apparatus further comprises an x-ray filter, comprising a filter ring having at least one emission aperture. The x-ray filter is located relative to the unfiltered x-ray emission to allow only a portion of the unfiltered x-ray emission to pass through the at least one emission aperture and form a filtered x-ray emission. The filter ring is rotatable about the anode to move the emission aperture relative to the unfiltered x-ray emission. The filter ring is supported by and moves along the vacuum tube. The preceding subject matter of this paragraph characterizes example 11 of the present disclosure.

The filter ring is concentric with the vacuum tube. The preceding subject matter of this paragraph characterizes example 12 of the present disclosure, wherein example 12 also includes the subject matter according to example 11, above.

The x-ray filter further comprises balls interposed between the filter ring and the vacuum tube. The filter ring is supported on the vacuum tube by the balls and movable about the vacuum tube via engagement with the balls. The preceding subject matter of this paragraph characterizes example 13 of the present disclosure, wherein example 13 also includes the subject matter according to any one of examples 11-12, above.

The x-ray filter further comprises a support ring concentric with and non-movably fixed directly to an exterior of the vacuum tube. The balls are interposed between the filter ring and the support ring. The filter ring is rotatable relative to the support ring. The balls roll along the support ring and the filter ring to allow rotation of the filter ring relative to the support ring. The preceding subject matter of this paragraph characterizes example 14 of the present disclosure, wherein example 14 also includes the subject matter according to example 13, above.

The support ring comprises a slit extending circumferentially along at least a portion of a circumference of the support ring. The support ring is located relative to the unfiltered x-ray emission to allow at least a portion of the unfiltered x-ray emission to pass through the slit before the portion of the unfiltered x-ray emission passes through the at least one emission aperture of the filter ring. The preceding subject matter of this paragraph characterizes example 15 of the present disclosure, wherein example 15 also includes the subject matter according to any one of examples 11-14, above.

The slit extends circumferentially along only a portion of the circumference of the support ring. The preceding subject matter of this paragraph characterizes example 16 of the present disclosure, wherein example 16 also includes the subject matter according to example 15, above.

The x-ray source is configured to shape the unfiltered x-ray emission to have an elliptical cross-sectional shape. The filter ring is rotatable about the anode in a rotational direction. The elliptical cross-sectional shape of the unfiltered x-ray emission projects onto the filter ring and is elongated in the rotational direction when projected onto the filter ring. The preceding subject matter of this paragraph characterizes example 17 of the present disclosure, wherein example 17 also includes the subject matter according to any one of examples 11-16, above.

Additionally disclosed herein a method of non-destructive inspection of a part. The method comprises steps of generating an electron emission having a circular cross-sectional shape, adjusting a shape of the electron emission from the circular cross-sectional shape into a first elliptical cross-sectional shape, converting the electron emission into an unfiltered x-ray emission having a second elliptical cross-sectional shape corresponding with the first elliptical cross-sectional shape, filtering only a portion of the unfiltered x-ray emission through an emission aperture of a filter ring, and rotating the filter ring relative to the unfiltered x-ray emission. The preceding subject matter of this paragraph characterizes example 18 of the present disclosure.

The step of adjusting the shape of the electron emission from the circular cross-sectional shape into the first elliptical cross-sectional shape comprises passing the electron emission through an electromagnetic field generated between a first pair of deflection plates and passing the electron emission through an electromagnetic field generated between a second pair of deflection plates. The first pair of deflection plates are angled relative to the second pair of deflection plates. The preceding subject matter of this paragraph characterizes example 19 of the present disclosure, wherein example 19 also includes the subject matter according to example 18, above.

The step of rotating the filter ring relative to the unfiltered x-ray emission comprises rotating the filter ring relative to a support ring, which is non-movably fixed directly to a vacuum tube that encloses the electron emission, along balls between the filter ring and the support ring. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Described herein is an x-ray backscatter system, and associated apparatus and method, for non-destructively inspecting parts. The x-ray backscatter system is configured to facilitate non-destructive inspection of parts with less wasted energy, with lower complexity, at a lower cost, and with higher portability than conventional x-ray backscatter systems. The configuration of conventional x-ray backscatter systems wastes up to 90% of the energy input into the systems. This is mainly due to the remoteness of the x-ray filtering device or wheel relative to the x-ray emission source and the circular shape of the x-ray emission generated by the x-ray emission source. The x-ray backscatter system of the present disclosure helps to reduce wasted energy, reduce complexity, save costs, and promote portability by locating the x-ray filter device at the vacuum tube of the x-ray emitter (which facilitates a smaller size of the x-ray backscatter system) and shaping the x-ray emission into a more efficient elliptical shape.

Figure 1:
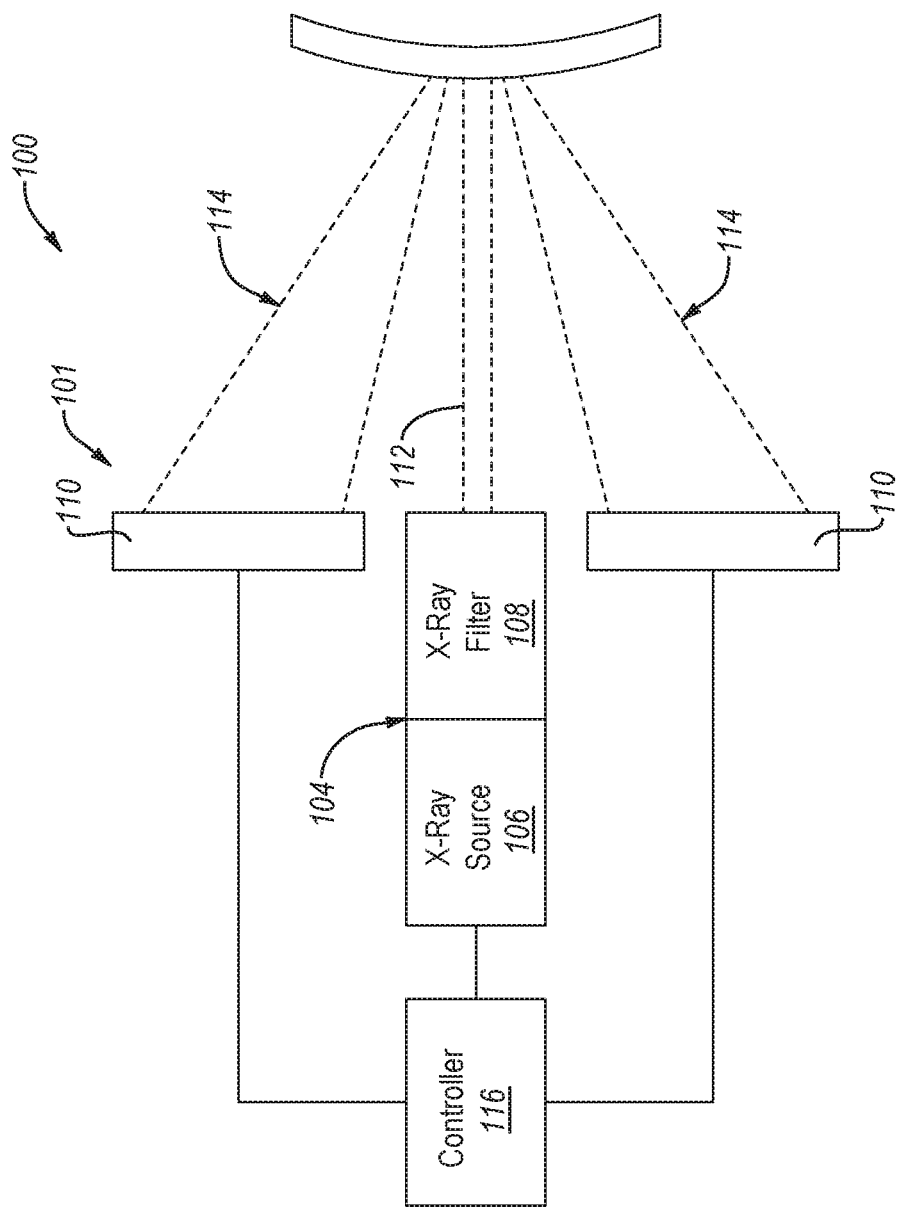
FIG. 1 is a schematic block diagram of a system for x-ray backscatter inspection of a part, according to one or more examples of the present disclosure.

Referring to FIG. 1, according to some examples, an x-ray backscatter system 100 is shown non-destructively inspecting a part 102. The part 102 can be any of various parts made of any of various materials. In one example, the part 102 is a part of an aircraft and the part 102 is made of a fiber-reinforced polymer. The x-ray backscatter system 100 includes an x-ray backscatter apparatus 101 and a controller 116. The x-ray backscatter apparatus 101 includes an x-ray emitter 104 and a plurality of x-ray detectors 110. The x-ray emitter 104 is configured to generate a filtered x-ray emission 112. The filtered x-ray emission 112 is directed at the part 102. Portions of the filtered x-ray emission 112 backscatter off of the surface of the part 102, partially penetrate the part 102 and backscatter off of internal features of the part 102, and pass entirely though the part 102. The backscattered portions 114 of the filtered x-ray emission 112 are detected by the x-ray detectors 110. The characteristics (e.g., wavelength, intensity, etc.) of the backscattered portions 114 detected by the x-ray detectors 110 are determined and analyzed by the controller 116 to determine the presence of abnormalities or other features in the part 102 being inspected. The controller 116 also controls the generation and characteristics of the filtered x-ray emission 112 by controlling operation of the x-ray emitter 104.

Figure 2:
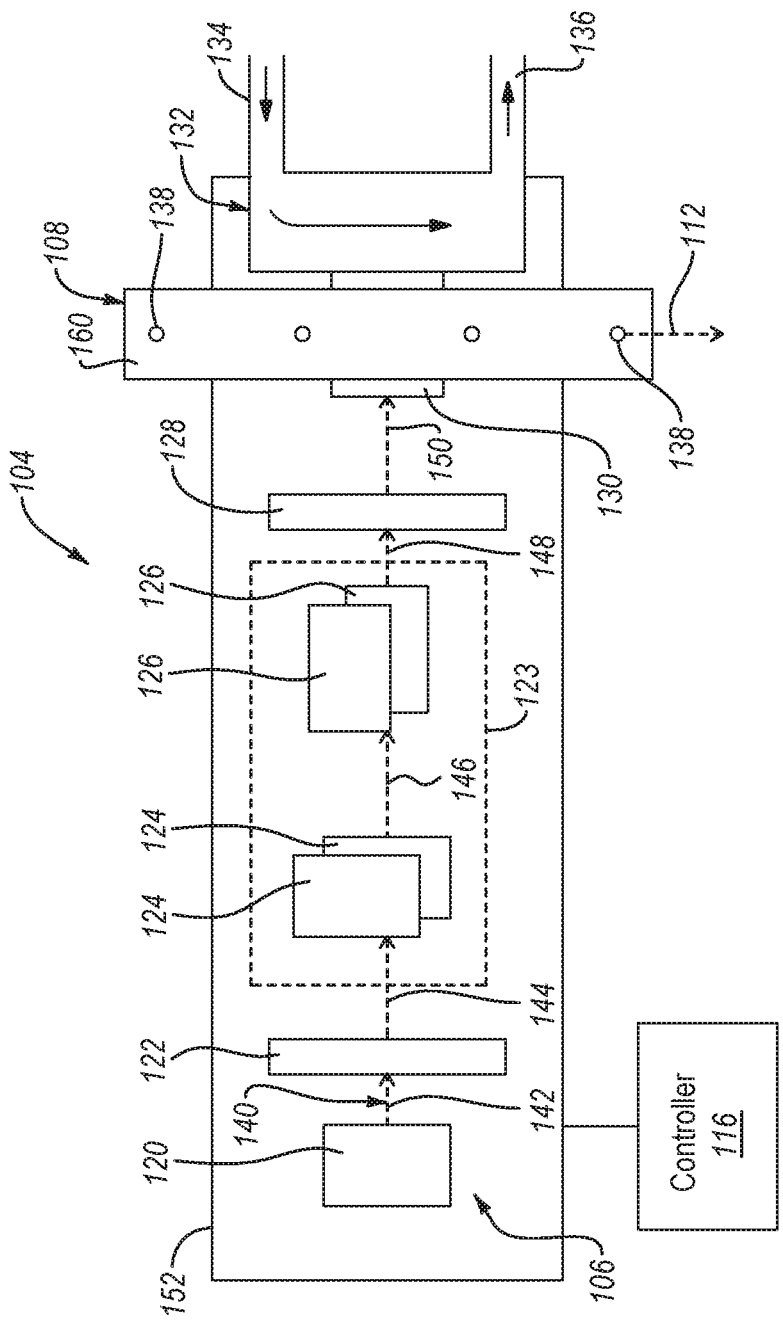
FIG. 2 is a schematic block diagram of an x-ray emitter of an x-ray backscatter apparatus of the system of FIG. 1, according to one or more examples of the present disclosure.
Figure 3:
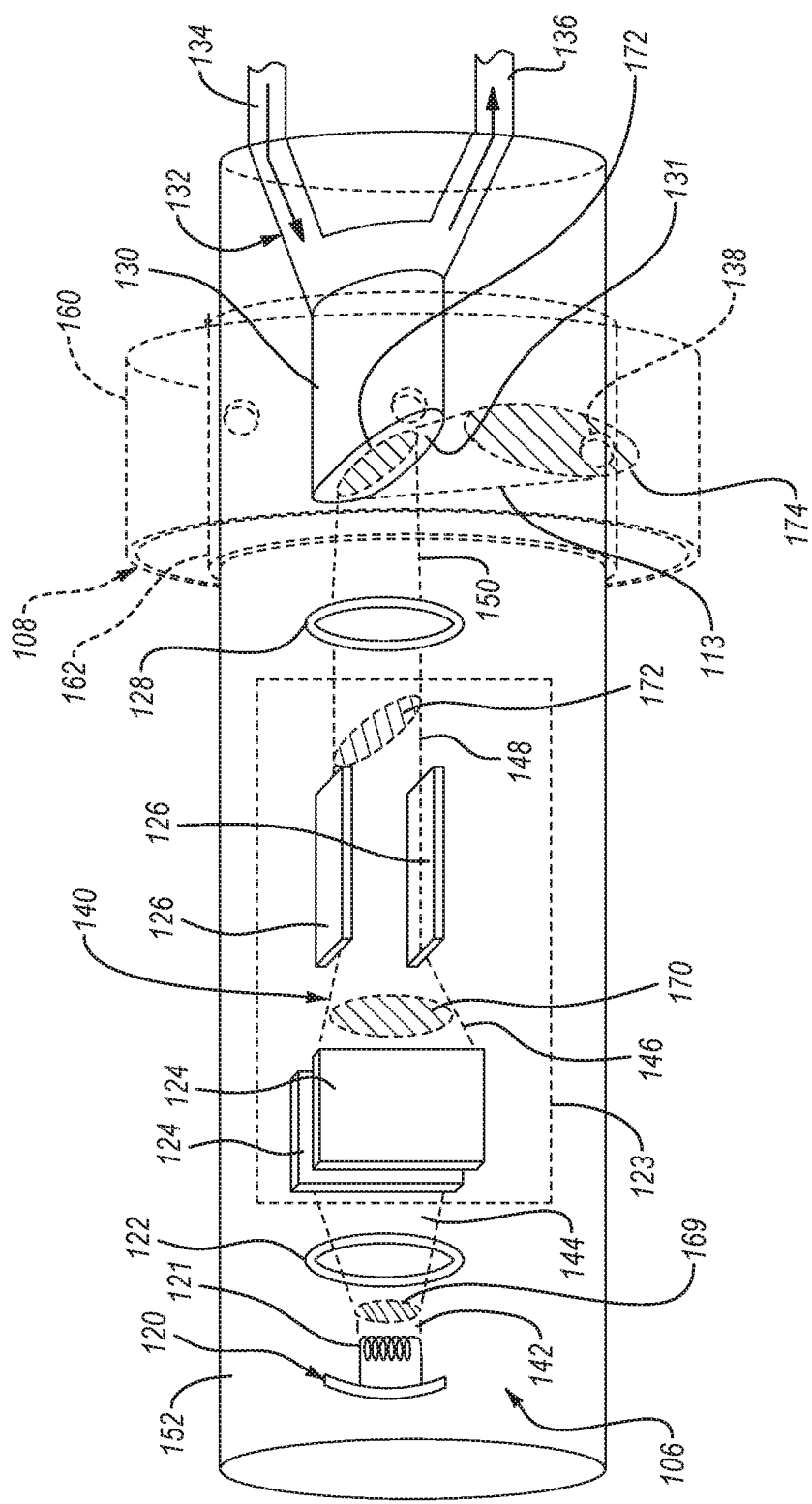
FIG. 3 is a perspective view of the x-ray emitter of the x-ray backscatter apparatus of the system of FIG. 1, shown with an x-ray filter of the x-ray emitter in dashed lines, according to one or more examples of the present disclosure.

The x-ray emitter 104 includes an x-ray source 106 and an x-ray filter 108. The x-ray source 106 generates an unfiltered x-ray emission 113 (see, e.g., FIGS. 3 and 7) and the x-ray filter 108 filters the x-ray emission 113 to produce the filtered x-ray emission 112. Referring to FIG. 2, the x-ray source 106 includes a cathode 120, an emission shaping mechanism 123, and an anode 130. The cathode 120 is selectively operable to generate an electron emission 140 by heating the cathode 120 via a thermionic emission process. As shown in FIG. 3, in certain examples, the cathode 120 includes a filament 121 that when heated release highly-charged electrons. The electron emission 140 includes a mass of the highly-charged electrons (i.e., ions) all moving in the same general direction and collectively defining a cross-sectional shape of the electron emission 140. The movement or acceleration of the electrons is facilitated by the positive charge of the anode 130 relative to the negative charge of the cathode 120.

The electron emission 140 ultimately reaches and impacts the anode 130. The anode 130 acts to rapidly decelerate the highly-charged electrons of the electron emission 140. The rapid deceleration of the highly-charged electrons causes energy from the electrons to be released as heat and x-rays (or photons). Accordingly, the anode 130 effectively transforms the electron emission 140 into the unfiltered x-ray emission 113. Generally, the anode 130 is made of a material and powered to stop and absorb the electrons of the electron emission 140. In some examples, the anode 130 is made of tungsten. The x-rays of the unfiltered x-ray emission 113 emit from the anode 130 at a direction defined by an angle of a deflecting surface 131 of the anode 130 (see, e.g., FIG. 3). Moreover, the x-rays collectively form the unfiltered x-ray emission 113 and collectively define a cross-sectional shape of the unfiltered x-ray emission 113.

As shown in FIG. 2, before reaching the anode 130, the electron emission 140 passes through the emission shaping mechanism 123, which is configured to adjust the cross-sectional shape of the electron emission 140 as is explained in more detail below. In the illustrated example, the emission shaping mechanism 123 includes a first pair of deflection plates 124 and a second pair of deflection plates 126. The second pair of deflection plates 126 are downstream of the first pair of deflection plates 124. The x-ray source 106 also includes one or more alignment coils that are configured to adjust a directionality of the electron emission 140 relative to the anode 130. In the illustrated example, the x-ray source 106 includes a first alignment coil 122 and a second alignment coil 128. The first alignment coil 122 is upstream of the first pair of deflection plates 124 and the second alignment coil 128 is downstream of the second pair of deflection plates 126. As used herein, downstream is the direction of the arrows representing the electron emission 140 in FIG. 2 and upstream is a direction opposite the direction of these arrows.

In the illustrated example, the x-ray filter 108 of the x-ray emitter 104 includes a filter ring 160 with a plurality of emission apertures 138. The filter ring 160, which can also be termed an aperture ring, receives the unfiltered x-ray emission 113 and blocks the unfiltered x-ray emission 113 except for a portion of the unfiltered x-ray emission 113 that is allowed to pass through the filter ring 160 via one emission aperture 138 at a time as the filter ring 160 rotates. The portion of the unfiltered x-ray emission 113 passing through an emission aperture 138 becomes the filtered x-ray emission 112 that is directed to the part 102.

The electron emission 140 experiences adjustments as it passes from the cathode 120 to the anode 130. Accordingly, the electron emission 140 can be divided into multiple portions each corresponding with the adjustment the immediately upstream feature imparted to the electron emission 140. Referring to FIG. 2, the electron emission 140 includes a non-adjusted portion 142 downstream of the cathode 120 and upstream of the first alignment coil 122. The electron emission 140 additionally includes a first redirected portion 144, downstream of the first alignment coil 122 and upstream of the first pair of deflection plates 124, a first reshaped portion 146, downstream of the first pair of deflection plates 124 and upstream of the second pair of deflection plates 126, and a second reshaped portion 148, downstream of the second pair of deflection plates 126 and upstream of the second alignment coil 128. The electron emission 140 also includes a second redirected portion 150, downstream of the second alignment coil 128 and upstream of the anode 130.

As shown in FIG. 3, the non-adjusted portion 142 of the electron emission 140 has a circular cross-sectional shape 169. In other words, the cathode 120, or the filament 121 of the cathode 120, generates an electron emission with a circular cross-sectional shape 169. The non-adjusted portion 142 of the electron emission 140 passes through the first alignment coil 122. In some examples, the first alignment coil 122 has an annular or ring-like shape and the electron emission 140 passes through the interior space defined by the ring-like shape.

As the electron emission 140 passes through the first alignment coil 122, the first alignment coil 122 adjusts the directionality of the electron emission 140 or changes the direction in which the electron emission 140 travels. According to certain examples, the first alignment coil 122 adjusts the directionality of the electron emission 140 by providing a magnetic field that slightly deflects the electron emission 140. As described below, slightly deflecting the electron emission 140 in this manner helps to optimize the alignment of the x-ray emission 113 with the emission apertures 138 of the filter ring 160. Moreover, the first alignment coil 122, and the corresponding adjustment to the directionality of the electron emission 140, can be controlled by the controller 116. Generally, in addition to helping align the x-ray emission 113 with the emission apertures 138 of the filter ring 160, the directionality of the electron emission 140 is adjusted by the first alignment coil 122 to ensure the electron emission 140 passes through the emission shaping mechanism 123 in a direction appropriate for shaping. The first redirected portion 144 of the electron emission 140, although potentially traveling in a different direction, has the same circular cross-sectional shape 169 as the non-adjusted portion 142 of the electron emission 140. Additionally, the first alignment coil 122 is capable of adjusting a cross-sectional diameter of the electron emission 140 if desired.

The first redirected portion 144 of the electron emission 140 is received by (e.g., passes between) the first pair of deflection plates 124. The deflection plates 124 of the first pair of deflection plates 124 are parallel to and spaced apart from each other. Each deflection plate 124 of the first pair of deflection plates 124 is configured to generate an electromagnetic field. The electromagnetic fields are directed across the electron emission 140 in a direction perpendicular to the flow direction of the electrons of the electron emission 140. The electromagnetic fields interact with the electrons and cause them to shift in the direction of the electromagnetic fields, which results in a change of the overall cross-sectional shape of the electron emission 140. More specifically, as the electron emission 140 passes between the deflection plates 124, the electromagnetic fields generated by the deflection plates 124 acts to increase a first dimension (e.g., length or diameter) of the circular cross-sectional shape 169 and leave a second dimension (e.g., width or diameter), that is perpendicular to the first dimension, of the circular cross-sectional shape 169 the same.

Figure 5:
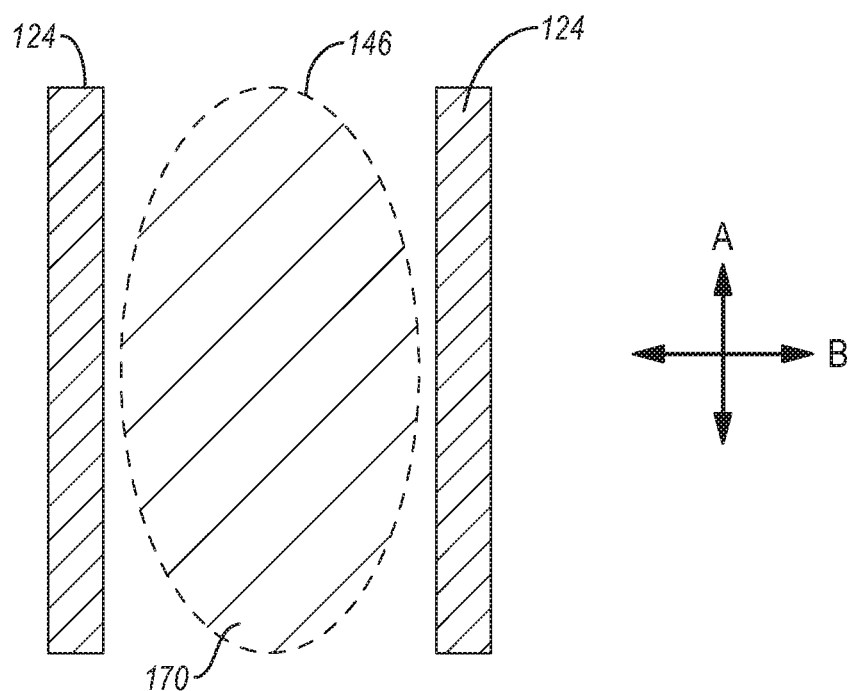
FIG. 5 is a cross-sectional side view of a first pair of deflection plates, taken along line 5-5 of FIG. 4, according to one or more examples of the present disclosure.

Because the circular cross-sectional shape 169 is circular, the first pair of deflection plates 124 increases the diameter of the cross-sectional shape of the first redirected portion 144 along a first plane A and maintains the diameter of the cross-sectional shape of the first redirected portion 144 along a second plane B perpendicular to the first plane (see, e.g., FIG. 5). Increasing the first dimension (e.g., length) of the circular cross-sectional shape 169 and maintaining the second dimension (e.g., width) of the circular cross-sectional shape 169 results in an elliptical cross-sectional shape. Accordingly, the first reshaped portion 146 of the electron emission 140 exiting the first pair of deflection plates 124 has an initial elliptical cross-sectional shape 170 or a shape that is elongated in one direction but not in another perpendicular direction.

After exiting the first pair of deflection plates 124, the first reshaped portion 146 of the electron emission 140 is received by (e.g., passes between) the second pair of deflection plates 126. The deflection plates 126 of the second pair of deflection plates 126 are parallel to and spaced apart from each other. Like the deflection plates 124, each deflection plate 126 of the first pair of deflection plates 126 is configured to generate an electromagnetic field that results in a change of the overall cross-sectional shape of the electron emission 140. However, the orientation of the second pair of deflection plates 126 is different than that of the first pair of deflection plates 124. The deflection plates 124 of the first pair of deflection plates 124 are parallel to each other and the first plane A and parallel to the flow direction of the electron emission 140. Similarly, the deflection plates 126 of the second pair of deflection plates 126 are parallel to each other and the second plane B and parallel to the flow direction of the electron emission 140. However, the first plane A is perpendicular to the second plane B in some examples.

Figure 6:
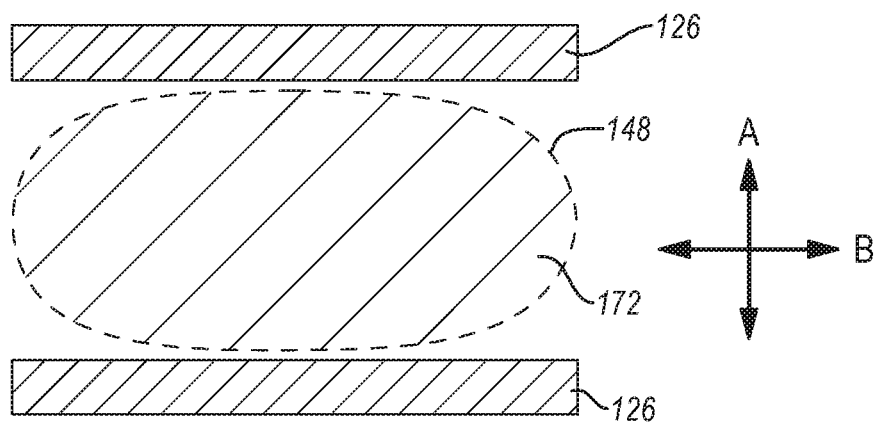
FIG. 6 is a cross-sectional side view of a first pair of deflection plates, taken along line 6-6 of FIG. 4, according to one or more examples of the present disclosure.

Therefore, as the electron emission 140 passes between the deflection plates 126, the electromagnetic fields generated by the deflection plates 126 act to decrease the second dimension (e.g., width) of the initial elliptical cross-sectional shape 170, now along the first plane A, and leave the first dimension (e.g., length), that is perpendicular to the second dimension and now along the second plane B, of the initial elliptical cross-sectional shape 170 the same (see, e.g., FIG. 6). Decreasing the second dimension (e.g., width) of the initial elliptical cross-sectional shape 170 and maintaining the first dimension (e.g., length) of the initial elliptical cross-sectional shape 170 results in a more elongated elliptical cross-sectional shape. Accordingly, the second shaped portion 148 of the electron emission 140 exiting the second pair of deflection plates 126 has a final elliptical cross-sectional shape 172 or a shape that is more elliptical (e.g., a higher length-to-width ratio) than the initial elliptical cross-sectional shape 170.

The second shaped portion 148 of the electron emission 140 with the final elliptical cross-sectional shape 172 exits the second pair of deflection plates 126 and passes through the second alignment coil 128. In some examples, the second alignment coil 128 is similar to or the same as the first alignment coil 122. For example, as the electron emission 140 passes through the second alignment coil 128, the second alignment coil 128 adjusts the directionality of the electron emission 140 or changes the direction in which the electron emission 140 travels. Like the first alignment coil 122, the second alignment coil 128, and the corresponding adjustment to the directionality of the electron emission 140, can be controlled by the controller 116. Generally, the directionality of the electron emission 140 is adjusted by the second alignment coil 128 to ensure the electron emission 140 impacts the deflecting surface 131 of the anode 130 at a desired (e.g., centered) location on the anode 130. The second redirected portion 150 of the electron emission 140, although potentially traveling in a different direction, has the same final elliptical cross-sectional shape 172 as the second shaped portion 148 of the electron emission 140.

Figure 7:
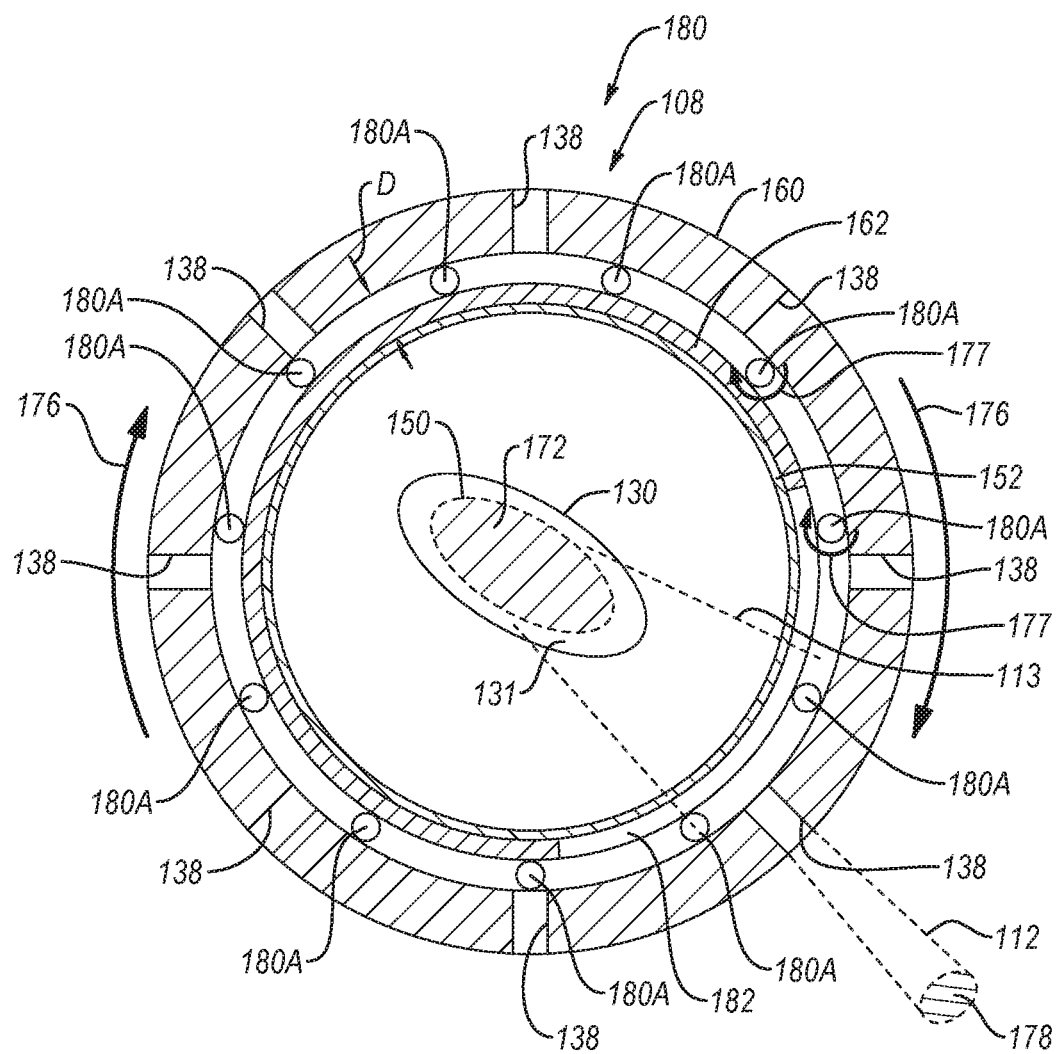
FIG. 7 is a cross-sectional side view of an x-ray filter and an anode, taken along line 7-7 of FIG. 4, according to one or more examples of the present disclosure.

Referring to FIGS. 3 and 7, when the second redirected portion 150 of the electron emission 140 impacts the deflecting surface 131 of the anode 130 it has the final elliptical cross-sectional shape 172. The deflecting surface 131 is flat. Accordingly, the unfiltered x-ray emission 113 generated by the anode 130 and deflected toward the x-ray filter 108 also has an elliptical cross-sectional shape 174 that corresponds with the final elliptical cross-sectional shape 172. In some examples, the elliptical cross-sectional shape 174 of the unfiltered x-ray emission 113 is the same as the final elliptical cross-sectional shape 172 of the second redirected portion 150 of the electron emission 140. Although the elliptical cross-sectional shape 174 is the same as the final elliptical cross-sectional shape 172, the size of the elliptical cross-sectional shape 174 is different (e.g., bigger) than the final elliptical cross-sectional shape 172 in some examples.

The deflecting surface 131 of the anode 130 is angled relative to the flow direction of the electron emission 140. Therefore, the flow direction of the unfiltered x-ray emission 113 is angled relative to the flow direction of the electron emission 140. Generally, the angle of the deflecting surface 131 of the anode 130 is selected such that the unfiltered x-ray emission 113 is directed to the x-ray filter 108. In certain examples, the x-ray filter 108 encircles the anode 130 and the flow direction of the unfiltered x-ray emission 113 is oblique (e.g., perpendicular) to the flow direction of the electron emission 140. As explained below, the orientation of the elliptical cross-sectional shape 174 of the unfiltered x-ray emission 113 is selected based on the location and orientation of the x-ray filter 108 relative to the anode 130.

Figure 4:
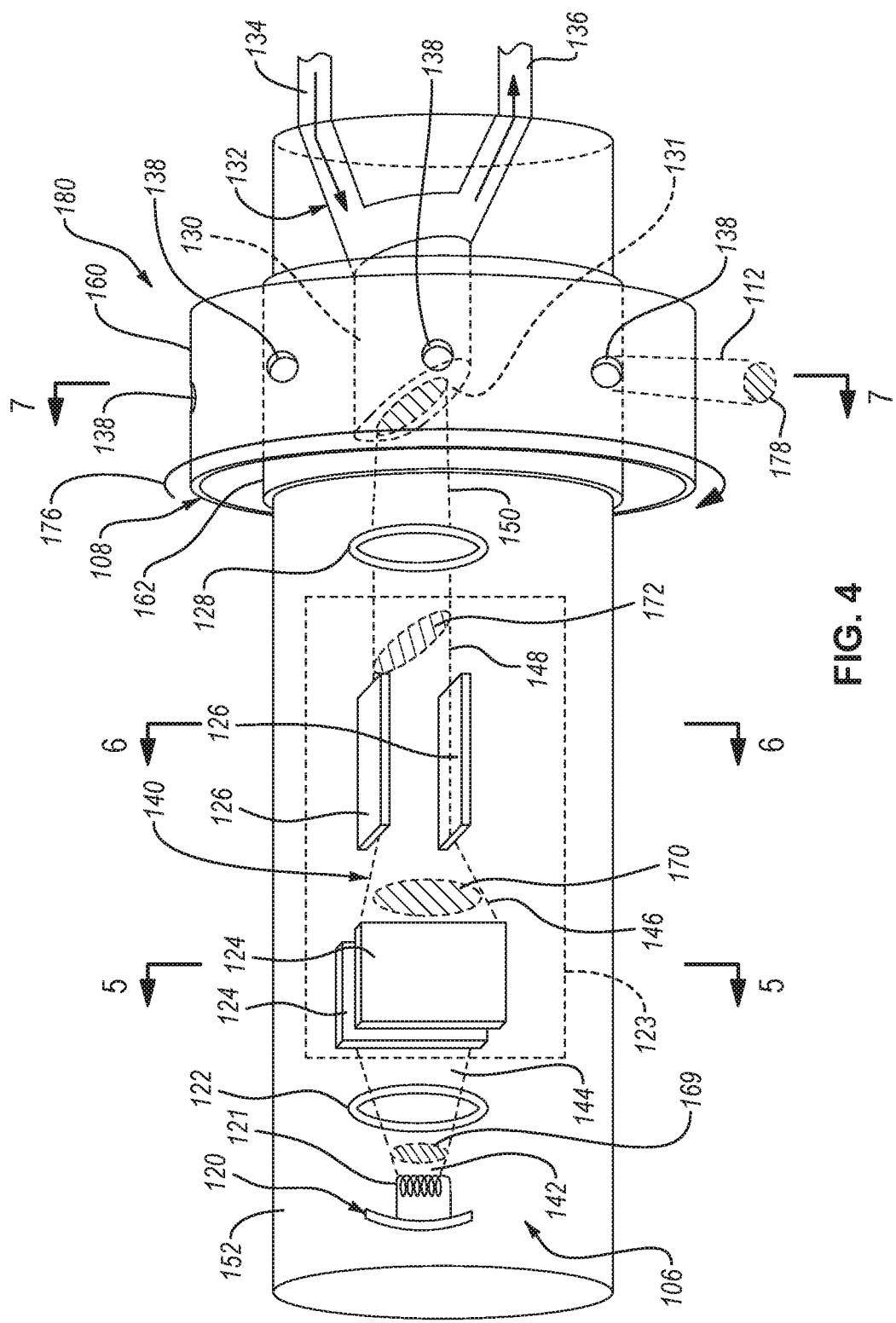
FIG. 4 is a perspective view of the x-ray emitter of the x-ray backscatter apparatus of the system of FIG. 1, shown with the x-ray filter of the x-ray emitter in solid lines, according to one or more examples of the present disclosure.
Figure 9:
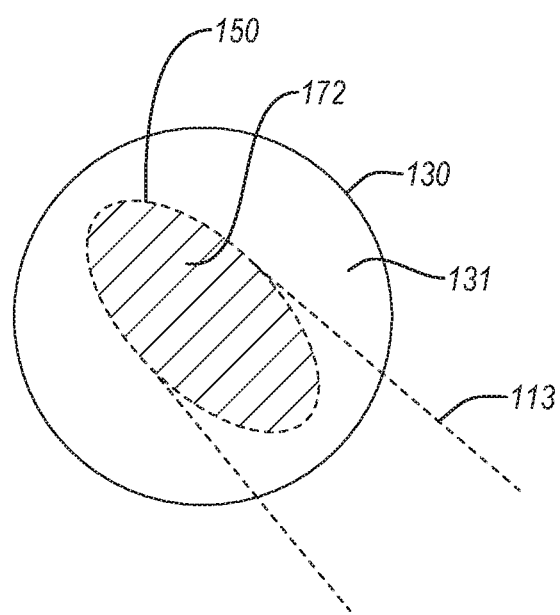
FIG. 9 is a side view of an anode and unfiltered x-ray emission, according to one or more examples of the present disclosure.

The conversion of the electron emission 140 to the unfiltered x-ray emission 113 at the deflecting surface 131 of the anode 130 generates heat. Referring to FIGS. 2-4, in some examples, the heat is dissipated via a cooling system 132 of the x-ray source 106. The cooling system 132 includes an input 134 and an output 136. A cooled cooling fluid flows into thermal transferring contact with the anode 130 from the input 134 and collects heat from the anode 130. The heated cooling fluid then exits through the output 136. The amount of heat required to be dissipated by the cooling system 132 is dependent on the size of the anode 130. Accordingly, the smaller the anode 130, the less heat that is needed to be dissipated and the less complex or robust the cooling system 132 needs to be. Referring to FIG. 7, in some examples, the shape of the deflecting surface 131 is elliptical to correspond with the final elliptical cross-sectional shape 172 of the electron emission 140. Shaping the deflecting surface 131 in this manner helps to reduce the size of the anode 130 the amount of heat generated by the anode 130. However, as shown in FIG. 9, in certain examples, the shape of the deflecting surface 131 can be circular, or some other shape, that does not correspond with the final elliptical cross-sectional shape 172 of the electron emission 140.

Referring to FIGS. 3 and 4, the x-ray filter 108 includes a filter ring 160 and a support ring 162. The support ring 162 is concentric with and non-movably fixed directly to an exterior of a vacuum tube 152 of the x-ray backscatter apparatus 101. Accordingly, the x-ray filter 108 is external to the vacuum tube 152. The vacuum tube 152 is a hollow, fully-enclosed, at least semi-transparent tube that houses the x-ray source 106. In some examples, the vacuum tube 152 is made of a transparent material, such as glass. The vacuum tube 152 has a tube-like shape that is elongated in the flow direction of the electron emission 140. The support ring 162 is fixed to the exterior of the vacuum tube 152 using any of various fixation techniques, such as fastening, adhering, bonding, and the like, that allow the support ring 162 to be supported directly by the vacuum tube 152. Moreover, the support ring 162 is fixed to the vacuum tube 152 at a location along the vacuum tube 152 that positions the support ring 162 to encircle the deflecting surface 131 of the anode 130. The support ring 162 is wide enough to receive an entirety of the unfiltered x-ray emission 113 generated by the anode 130.

Figure 8:
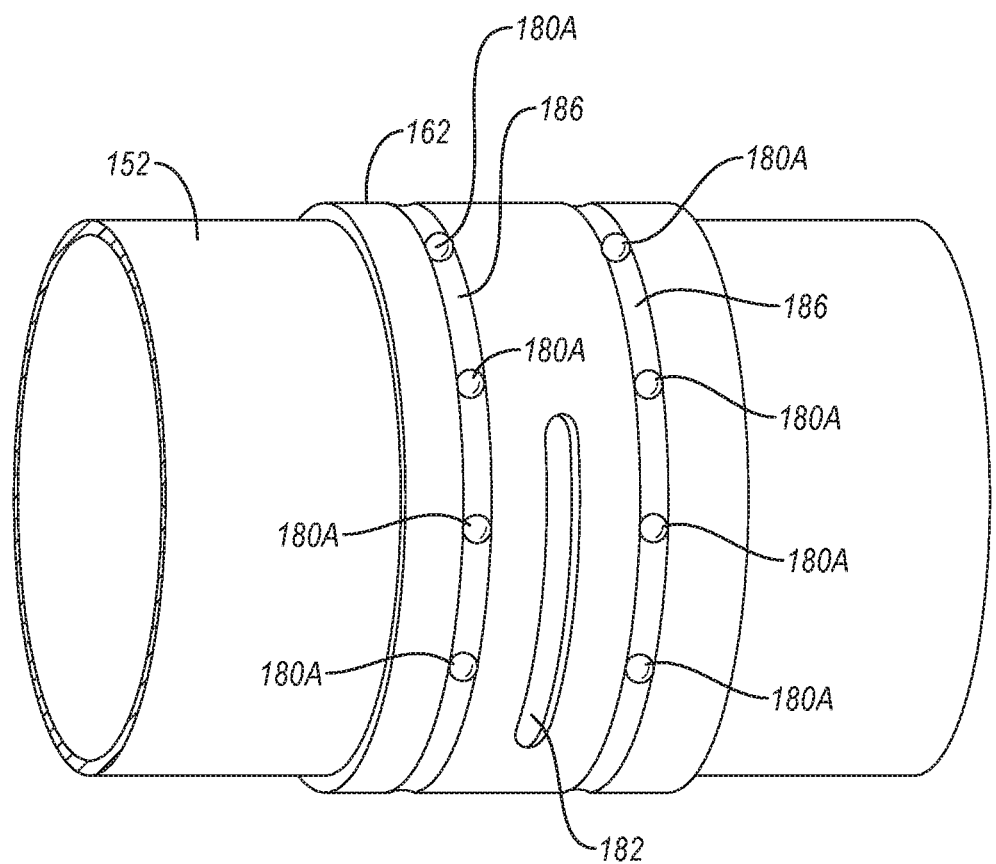
FIG. 8 is a perspective view of a support ring and balls of an x-ray filter, according to one or more examples of the present disclosure.

However, all or a portion of the unfiltered x-ray emission 113 received by the support ring 162 is allowed to pass through the support ring 162 via a slit 182 formed in the support ring 162 (see, e.g., FIGS. 7 and 8). In some examples, the slit 182 is elongated in a circumferential direction about at least a circumference of the support ring 162. In the illustrated example, slit 182 extends circumferentially along only a portion of the circumference of the support ring 162. However, in other examples, the support ring 162 is comprises of two halves and the slit 182 is defined between the two halves and extends along an entirety of the circumference of the support ring 162 to effectively divide the support ring 162 into the two halves.

The filter ring 160 includes at least one emission aperture 138, which is a through-aperture. In certain examples, as shown, the filter ring 160 includes multiple emission apertures 138 in a spaced apart arrangement along a circumference of the filter ring 160. Each one of the emission apertures 138 has a cross-sectional size that is smaller than the size of the elliptical cross-sectional shape 174 of the unfiltered x-ray emission 113. Each one of the emission apertures 138 can have any of various shapes, such as circular. The emission apertures 138 are circumferentially aligned with the slit 182 of the support ring 162.

The filter ring 160, the support ring 162, and balls 180A of the x-ray filter 108 form a ball bearing assembly 180 or rolling-element bearing assembly. The filter ring 160, which acts as the first race of the ball bearing assembly 180, is movably supported on the support ring 162, which acts as the second race of the ball bearing assembly 180, by balls 180A. Accordingly, the balls 180A are interposed between the filter ring 160 and the support ring 162, which also results in the balls 180A being interposed between the filter ring 160 and the vacuum tube 152. In this manner, the filter ring 160 is movably supported on the vacuum tube 152 by the balls 180A. As shown in FIG. 8, the balls 180A of the ball bearing assembly 180 are circumferentially spaced apart from each other. For stability, in some examples and as shown, the balls 180A are divided into at least two circumferential sets that are spaced apart from each other along a length of the vacuum tube 152. The balls 180A are designed to roll along the filter ring 160, acting as the first trace of the ball bearing assembly 180, and the support ring 162, acting as the second trace of the ball bearing assembly 180, in a circumferential direction. To maintain movement of the balls 180A within a circumferential path, each of the surfaces of the filter ring 160 and the support ring 162 that face each other include corresponding circumferential grooves 186, cages, or other guide structures, that maintain the balls 180A between the filter ring and the support ring 162.

In view of the foregoing, the filter ring 160 is supported on the balls 180A and concentrically encircles the support ring 162. Accordingly, the filter ring 160 is concentric with the vacuum tube 152. The balls 180A roll, in rotational direction 177, along the filter ring 160 in the circumferential direction to facilitate low-friction rotation of the filter ring 160 relative to the support ring 162 and the vacuum tube 152. In other words, the filter ring 160 is movable (e.g., rotatable) about the support ring 162 and the vacuum tube 152, in the rotational direction 176, via engagement with the balls 180A. The filter ring 160 is radially spaced apart from the support ring 162 by a dimension of the balls 180A. In other words, the filter ring 160 is in close proximity to the support ring 162. Moreover, because the support ring 162 is affixed onto the vacuum tube 152, the filter ring 160 is also in close proximity to the vacuum tube 152. In fact, the filter ring 160 is radially spaced from the vacuum tube 152 by a distance D equal to the dimension (e.g., a diameter or a portion of the diameter) of the balls 180A and a thickness of the support ring 162 (see, e.g., FIG. 7). In some examples, the distance D is between 1 mm and 100 mm. According to one specific example, the distance D is between 5 mm and 20 mm. Although a ball bearing arrangement is shown and described, in other examples, the support ring 162 can be rotatably mounted on the vacuum tube 152 using other comparable techniques.

The elliptical cross-sectional shape 174 of the unfiltered x-ray emission 113 is oriented such that the elliptical cross-sectional shape 174 is elongated along a circumference of the support ring 162. In this manner, the elliptical cross-sectional shape 174 is elongated along the slit 182. Accordingly, a larger quantity or concentration of the unfiltered x-ray emission 113 is allowed to pass through the slit 182, compared to an emission with a circular cross-sectional shape. With the elliptical cross-sectional shape 174 elongated along the circumference of the support ring 162, the elliptical cross-sectional shape 174 is also elongated along a circumference of the filter ring 160 and a length of the elliptical cross-sectional shape 174 is parallel with the rotational direction. In this manner, a larger quantity or concentration of the unfiltered x-ray emission 113 is circumferentially aligned with the emission apertures 138 of the filter ring 160, which helps to reduce wasted energy by reducing the portion of the unfiltered x-ray emission 113 blocked by the filter ring 160.

The filter ring 160 rotates in the rotational direction 176 about the vacuum tube 152 as shown in FIGS. 4 and 7. As the filter ring 160 rotates, the emission apertures 138 pass over the slit 182 of the support ring 162 one by one. As one emission aperture 138 passes over the slit 182, a portion of the unfiltered x-ray emission 113 passing through the slit 182 also passes through the emission aperture 138 to generate the filtered x-ray emission 112. The cross-sectional shape of the filtered x-ray emission 112 corresponds with the shape of the emissions aperture 138. In the illustrated example, the emissions apertures 138 are circular, which generates a circular cross-sectional shape 178 of the filtered x-ray emission 112. As the emission aperture 138 passes over the slit 182, different portions of the unfiltered x-ray emission 113 pass through the emission aperture 138 to effectively translationally move the filtered x-ray emission 112 in a linear path along the part 102. Then another emission aperture 138 passes over the slit 182 and produces a similarly translationally moving filtered x-ray emission 112.

Due to the elongated nature and orientation of the elliptical cross-sectional shape 174 of the unfiltered x-ray emission 113, more of the unfiltered x-ray emission 113 passes through an emission aperture 138 as it passes over the slit 182. Because more of the unfiltered x-ray emission 113 passes through the emission apertures 138 to form the filtered x-ray emission 112, less energy is wasted and thus less energy is needed to generate the electron emission 140 for a filtered x-ray emission 112 of a given energy level. Accordingly, the energy supplied to the x-ray backscatter apparatus 101 and system 100 can be reduced, which enables the operational costs, weight, and size of the x-ray backscatter apparatus 101 to also be reduced. For example, the cooling system 132 can be simplified and reduced in size because, with less energy being supplied to the x-ray backscatter apparatus 102 (which results in the electron emission 140 having less energy), the anode 130 of the x-ray backscatter apparatus 102 is generating less heat.

Figure 10:
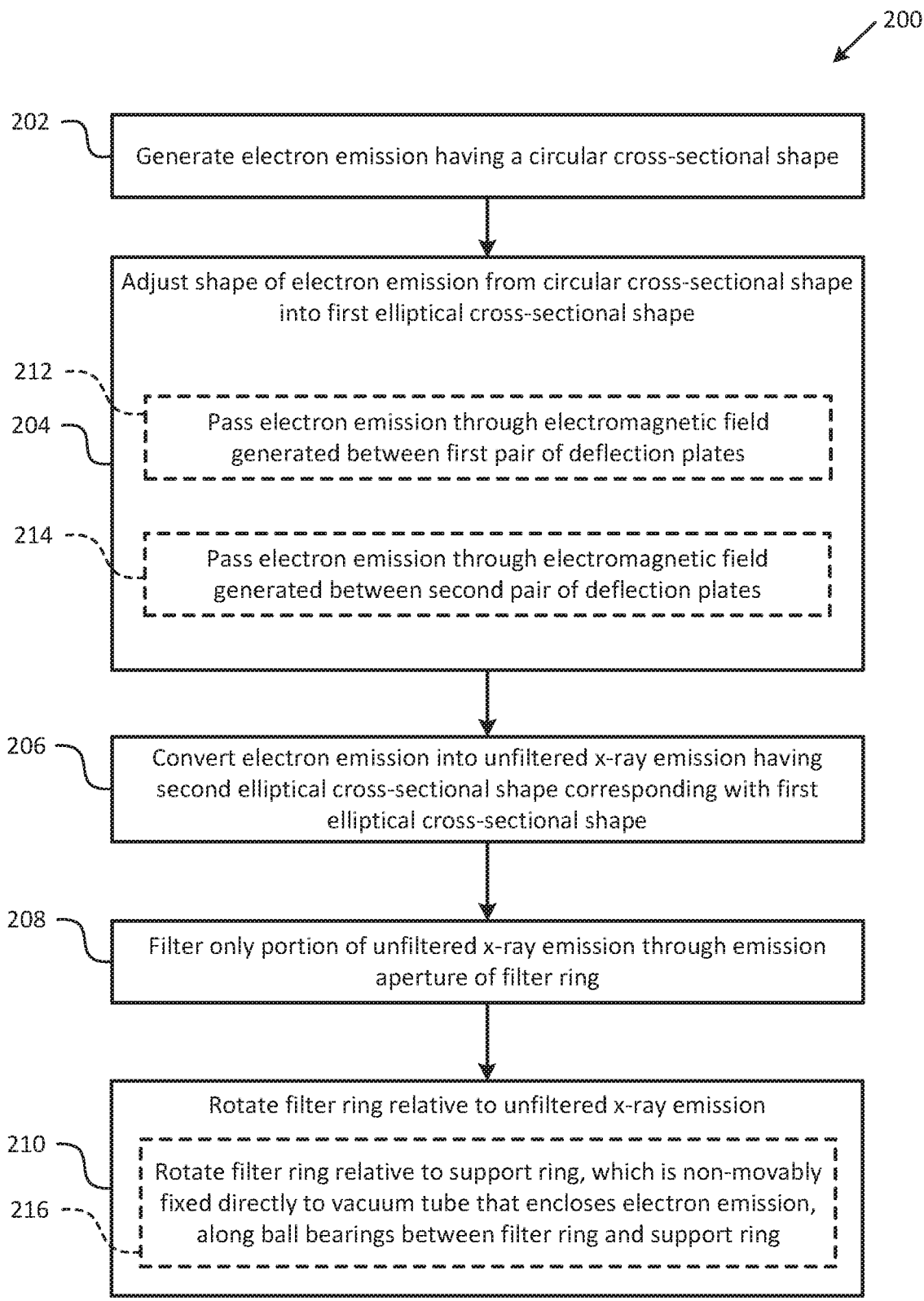
FIG. 10 is a schematic flow chart of a method of non-destructive inspection of a part, according to one or more examples of the present disclosure.

Referring to FIG. 10, and according to some examples, disclosed herein is a method 200 of non-destructive inspection of the part 102. The method 200 can be executed using the x-ray backscatter system 100 of the present disclosure. The method 200 includes (block 202) generating the electron emission 140 having the circular cross-sectional shape 169 and (block 204) adjusting the shape of the electron emission 140 from the circular cross-sectional shape 169 into the first elliptical cross-sectional shape 172. In certain examples, the step of adjusting the shape of the electron emission 140 includes one or more of (block 212) passing the electron emission 140 through the electromagnetic field generated between the first pair of deflection plates 124 and (block 214) passing the electron emission 140 through the electromagnetic field generated between the second pair of deflection plates 126. The method 200 also includes (block 206) converting the electron emission 140 into the unfiltered x-ray emission 113 having the second elliptical cross-sectional shape 174 corresponding with the first elliptical cross-sectional shape 172. The method 200 additionally includes (block 208) filtering only a portion of the unfiltered x-ray emission 113 through the emission aperture 138 of the filter ring 160 and (block 210) rotating the filter ring 160 relative to the unfiltered x-ray emission 113. In some examples, the step of rotating the filter ring 160 includes (block 216) rotating the filter ring 160 relative to the support ring 162.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An x-ray backscatter apparatus for non-destructive inspection of a part, the apparatus comprising:

an x-ray source, comprising:
- a cathode that is selectively operable to generate an electron emission having a circular cross-sectional shape;
- an emission shaping mechanism, configured to receive the electron emission from the cathode and adjust a shape of the electron emission from the circular cross-sectional shape into a first elliptical cross-sectional shape; and
- an anode, configured to receive the electron emission having the first elliptical cross-sectional shape from the emission shaping mechanism and convert the electron emission into an unfiltered x-ray emission having a second elliptical cross-sectional shape corresponding with the first elliptical cross-sectional shape; and an x-ray filter, comprising an emission aperture having a cross-sectional area smaller than an area of the second elliptical cross-sectional shape of the unfiltered x-ray emission, wherein the x-ray filter is located relative to the unfiltered x-ray emission to allow only a portion of the unfiltered x-ray emission to pass through the emission aperture and form a filtered x-ray emission.

2. The x-ray backscatter apparatus according to claim 1, wherein:
the emission shaping mechanism comprises at least one pair of deflection plates that is configured to adjust the shape of the electron emission as the electron emission passes between the deflection plates of the at least one pair of deflection plates; and
each deflection plate of the at least one pair of deflection plates is configured to generate an electromagnetic field.

3. The x-ray backscatter apparatus according to claim 1, wherein:
the emission shaping mechanism comprises a first pair of deflection plates and a second pair of deflection plates;
the first pair of deflection plates is configured to adjust the shape of the electron emission from the circular cross-sectional shape to a third elliptical cross-sectional shape;
the second pair of deflection plates is configured to adjust the shape of the electron emission from the third elliptical cross-sectional shape to the first elliptical cross-sectional shape; and
the third elliptical cross-sectional shape is different than the first elliptical cross-sectional shape.

4. The x-ray backscatter apparatus according to claim 3, wherein:
the first pair of deflection plates increases a length of the circular cross-sectional shape; and
the second pair of deflection plates decreases a width of the third elliptical cross-sectional shape.

5. The x-ray backscatter apparatus according to claim 1, wherein:
the emission shaping mechanism comprises a first pair of deflection plates and a second pair of deflection plates;
the deflection plates of the first set of deflection plates are spaced apart from each other and parallel to a first plane;
the deflection plates of the second set of deflection plates are spaced apart from each other and parallel to a second plane; and
the first plane is perpendicular to the second plane.

6. The x-ray backscatter apparatus according to claim 1, wherein the x-ray source further comprises at least one alignment coil that is configured to adjust a directionality of the electron emission relative to the anode.

7. The x-ray backscatter apparatus according to claim 1, wherein:
the x-ray source further comprises a first alignment coil and a second alignment coil;
the first alignment coil is interposed between the cathode and the emission shaping mechanism; and
the second alignment coil is interposed between the emission shaping mechanism and the anode.

8. The x-ray backscatter apparatus according to claim 1, wherein:
the x-ray filter comprises a filter ring;
the emission aperture is formed in the filter ring; and
the filter ring is rotatable about the anode to move the emission aperture relative to the unfiltered x-ray emission.

9. The x-ray backscatter apparatus according to claim 1, wherein:
the x-ray filter comprises a filter ring;
the filter ring is rotatable in a rotational direction; and
the second elliptical cross-sectional shape of the unfiltered x-ray emission projects onto the filter ring and is elongated in the rotational direction when projected onto the filter ring.

10. The x-ray backscatter apparatus according to claim 1, further comprising a vacuum tube, wherein:
the x-ray filter comprises a filter ring;
the emission aperture is formed in the filter ring;
the x-ray source is enclosed within the vacuum tube;
the x-ray filter is external to the vacuum tube; and
the filter ring is supported by and moves along the vacuum tube.

11. An x-ray backscatter apparatus for non-destructive inspection of a part, the apparatus comprising:
a vacuum tube;
an x-ray source, enclosed within the vacuum tube and comprising:
- a cathode that is selectively operable to generate an electron emission having a circular cross-sectional shape;
- an emission shaping mechanism, configured to receive the electron emission from the cathode and adjust a shape of the electron emission from the circular cross-sectional shape into a first elliptical cross-sectional shape; and
- an anode, configured to receive the electron emission having the first elliptical cross-sectional shape from the emission shaping mechanism and convert the electron emission into an unfiltered x-ray emission having a second elliptical cross-sectional shape corresponding with the first elliptical cross-sectional shape; and an x-ray filter, comprising a support ring and a filter ring, wherein:
the support ring is concentric with and non-movably fixed directly to an exterior of the vacuum tube;
the filter ring is coupled to the support ring;
the filter ring has at least one emission aperture;
the x-ray filter is located relative to the unfiltered x-ray emission to allow only a portion of the unfiltered x-ray emission to pass through the at least one emission aperture and form a filtered x-ray emission;
the filter ring is rotatable about the anode to move the emission aperture relative to the unfiltered x-ray emission; and the filter ring is supported by and moves along the support ring and the vacuum tube.

12. The x-ray backscatter apparatus according to claim 11, wherein the filter ring is concentric with the vacuum tube.

13. The x-ray backscatter apparatus according to claim 11, wherein:
the x-ray filter further comprises balls interposed between the filter ring and the vacuum tube; and
the filter ring is supported on the vacuum tube by the balls and movable about the vacuum tube via engagement with the balls.

14. The x-ray backscatter apparatus according to claim 13, wherein:
the balls are interposed between the filter ring and the support ring;
the filter ring is rotatable relative to the support ring; and
the balls roll along the support ring and the filter ring to allow rotation of the filter ring relative to the support ring.

15. The x-ray backscatter apparatus according to claim 11, wherein:
the support ring comprises a slit extending circumferentially along at least a portion of a circumference of the support ring; and
the support ring is located relative to the unfiltered x-ray emission to allow at least a portion of the unfiltered x-ray emission to pass through the slit before the portion of the unfiltered x-ray emission passes through the at least one emission aperture of the filter ring.

16. The x-ray backscatter apparatus according to claim 15, wherein the slit extends circumferentially along only a portion of the circumference of the support ring.

17. The x-ray backscatter apparatus according to claim 11, wherein:
the filter ring is rotatable about the anode in a rotational direction; and
the second elliptical cross-sectional shape of the unfiltered x-ray emission projects onto the filter ring and is elongated in the rotational direction when projected onto the filter ring.

18. A method of non-destructive inspection of a part, the method comprising steps of:
generating an electron emission having a circular cross-sectional shape;
adjusting a shape of the electron emission from the circular cross-sectional shape into a first elliptical cross-sectional shape;
converting the electron emission into an unfiltered x-ray emission having a second elliptical cross-sectional shape corresponding with the first elliptical cross-sectional shape;
filtering only a portion of the unfiltered x-ray emission through an emission aperture of a filter ring; and
rotating the filter ring relative to the unfiltered x-ray emission.

19. The method according to claim 18, wherein the step of adjusting the shape of the electron emission from the circular cross-sectional shape into the first elliptical cross-sectional shape comprises:
passing the electron emission through an electromagnetic field generated between a first pair of deflection plates; and
passing the electron emission through an electromagnetic field generated between a second pair of deflection plates;
wherein the first pair of deflection plates are angled relative to the second pair of deflection plates.

20. The method according to claim 18, wherein the step of rotating the filter ring relative to the unfiltered x-ray emission comprises rotating the filter ring relative to a support ring, which is non-movably fixed directly to a vacuum tube that encloses the electron emission, along balls between the filter ring and the support ring.

* * * * *